(12) United States Patent
Yang

(10) Patent No.: US 11,864,173 B2
(45) Date of Patent: Jan. 2, 2024

(54) RESOURCE SCHEDULING METHOD AND APPARATUS

(71) Applicant: VIVO MOBILE COMMUNICATION CO., LTD., Guangdong (CN)

(72) Inventor: Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 25 days.

(21) Appl. No.: 17/212,952

(22) Filed: Mar. 25, 2021

(65) Prior Publication Data

US 2021/0212090 A1 Jul. 8, 2021

Related U.S. Application Data

(63) Continuation of application No. PCT/CN2019/106797, filed on Sep. 19, 2019.

(30) Foreign Application Priority Data

Sep. 26, 2018 (CN) .......................... 201811126943.3

(51) Int. Cl.
*H04W 72/1263* (2023.01)
*H04W 28/02* (2009.01)
(Continued)

(52) U.S. Cl.
CPC ... *H04W 72/1263* (2013.01); *H04W 28/0278* (2013.01); *H04W 72/535* (2023.01); *H04W 80/02* (2013.01); *H04W 92/18* (2013.01)

(58) Field of Classification Search
None
See application file for complete search history.

(56) References Cited

U.S. PATENT DOCUMENTS 11,212,874 B2 * 12/2021 Ron ...................... H04W 76/14
2007/0010250 A1 * 1/2007 Bosch ............... H04W 36/0011
455/436

(Continued)

FOREIGN PATENT DOCUMENTS

CN 107079469 A 8/2017
CN 107592984 A 1/2018
(Continued)

OTHER PUBLICATIONS

Written Opinion and International Search Report in Application No. PCT/CN2019/106797 dated Dec. 19, 2019.
(Continued)

*Primary Examiner* — Khaled M Kassim
*Assistant Examiner* — Berhanu D Belete
(74) *Attorney, Agent, or Firm* — Maschoff Brennan

(57) ABSTRACT

The embodiments of this application provide a resource scheduling method and apparatus, and relate to the field of communications technologies, to resolve the problem that how to schedule a SL resource is not provided in the related technologies. The method includes: when data is needed to be sent on a SL, or a BSR of a SL triggers a scheduling request SR, sending a SR to a network side device by using a target resource, where the SR is used to request the network side device to configure a SL sending resource for the terminal device. The embodiments of this application are used to schedule a SL sending resource.

15 Claims, 3 Drawing Sheets

(51) Int. Cl.
*H04W 80/02* (2009.01)
*H04W 72/50* (2023.01)
*H04W 92/18* (2009.01)

(56) References Cited

U.S. PATENT DOCUMENTS

| | | | |
|---|---|---|---|
| 2016/0100389 A1* | 4/2016 | Zhao | H04L 5/0007 370/329 |
| 2016/0128094 A1 | 5/2016 | Lee et al. | |
| 2016/0135217 A1* | 5/2016 | Lee | H04L 47/30 370/329 |
| 2017/0041902 A1 | 2/2017 | Sheng | |
| 2017/0086254 A1* | 3/2017 | Lee | H04W 72/21 |
| 2017/0171837 A1 | 6/2017 | Chen et al. | |
| 2017/0238337 A1* | 8/2017 | Lee | H04W 28/0278 370/329 |
| 2017/0290028 A1* | 10/2017 | Lee | H04W 28/02 |
| 2017/0303319 A1 | 10/2017 | Han | |
| 2018/0035329 A1 | 2/2018 | Futaki | |
| 2018/0255499 A1* | 9/2018 | Loehr | H04W 40/22 |
| 2018/0255532 A1* | 9/2018 | Li | H04L 1/00 |
| 2018/0263062 A1* | 9/2018 | Lee | H04W 74/08 |
| 2018/0279324 A1* | 9/2018 | Wang | H04L 5/0055 |
| 2019/0007930 A1* | 1/2019 | Zhao | H04W 72/21 |
| 2020/0029353 A1* | 1/2020 | Xu | H04W 72/21 |
| 2021/0337424 A1* | 10/2021 | Basu Mallick | H04W 72/21 |

FOREIGN PATENT DOCUMENTS

| | | |
|---|---|---|
| CN | 108141847 A | 6/2018 |
| JP | 2018500846 A | 1/2018 |
| WO | 2016142978 A1 | 9/2016 |
| WO | 2016/178552 A1 | 11/2016 |
| WO | 2017194212 A1 | 11/2017 |

OTHER PUBLICATIONS

EP Search Report in Application No. 19865149.9 dated Nov. 5, 2021.
"Latency reduction in eV2x" 3GPP TSG-RAN2 Meeting #101bis, R2-1804358, OPPO, Apr. 16, 2018.
JP Office Action in Application No. 2021-517423 dated Apr. 25, 2022.
"Other Uu Enhancements for V2X" 3GPP TSG-RAN WG2 #94, Ericsson, R2-164104, May 23, 2016.

* cited by examiner

RESOURCE SCHEDULING METHOD AND APPARATUS

CROSS-REFERENCE OF RELATED APPLICATION

The present application is a continuation application of PCT Application No. PCT/CN2019/106797 filed on Sep. 19, 2019, which claims a priority of the Chinese patent application No. 201811126943.3 filed on Sep. 26, 2018, which are incorporated herein by reference in their entirety.

TECHNICAL FIELD

Embodiments of this application relate to the field of communications technologies, and in particular, to a resource scheduling method and apparatus.

BACKGROUND

Communication on a sidelink (sidelink, SL) is a direct connection communication technology between apparatuses without transmission or forwarding by a network side device such as a base station. Through SL communication, resource utilization and network capacities can be improved. Therefore, SL communication has bright application prospects.

At present, the existing related technology stipulates that when a terminal device needs to send uplink data to a network side device, the terminal device first sends an scheduling request (Scheduling Request, SR) to the network side device on a specified uplink resource, and the network side device allocates an uplink grant (UL grant) to the terminal device after receiving the SR sent by the terminal device. Then, the terminal device sends a BSR to the network side device based on the uplink grant. After receiving the BSR sent by the terminal device, according to the BSR, the network side device obtains a data volume and a priority of an uplink service that the terminal device needs to send, and schedules a resource to send the uplink data according to the data volume and the priority of the uplink service. However, the existing related technology provides no effective solution on how to schedule a resource used to send data on an SL.

SUMMARY

According to a first aspect, the embodiments of this application provide a resource scheduling method, applied to a terminal device. The method includes: when data is needed to be sent on a sidelink (Sidelink, SL), or a buffer status report (Buffer Status Report, BSR) of a SL triggers a scheduling request SR, sending a SR to a resource scheduling apparatus by using a target resource, where
  the SR is used to request the resource scheduling apparatus to configure a SL sending resource for the terminal device.

According to a second aspect, the embodiments of this application provide a resource scheduling method, applied to a resource scheduling apparatus. The method includes:
  receiving a scheduling request SR sent by a terminal device by using a target resource, where the SR is used to request the resource scheduling apparatus to configure, for the terminal device, a resource used to send either data that needs to be sent on a SL or data indicated by a data buffer status of a BSR of an SL; and
  configuring a SL sending resource for the terminal device according to the SR and the target resource.

According to a third aspect, the embodiments of this application provide a terminal device, including:
  a sending unit, configured to: when data is needed to be sent on a SL, or a BSR of a SL triggers a scheduling request SR, send a SR to a resource scheduling apparatus by using a target resource, where
  the SR is used to request the resource scheduling apparatus to configure a SL sending resource for the terminal device.

According to a fourth aspect, the embodiments of this application provide a resource scheduling apparatus, including:
  a receiving unit, configured to receive a scheduling request SR sent by a terminal device by using a target resource, where the SR is used to request the resource scheduling apparatus to configure, for the terminal device, a resource used to send data that needs to be sent on a SL or data indicated by a data buffer status of a BSR of an SL; and
  a scheduling unit, configured to configure a SL sending resource for the terminal device according to the SR and the target resource.

According to a fifth aspect, the embodiments of this application provide a terminal device, including a processor, a memory, and a computer program that is stored in the memory and that can run on the processor, and when the computer program is executed by the processor, steps of the resource scheduling method provided in the first aspect are implemented.

According to a sixth aspect, the embodiments of this application provide a resource scheduling apparatus, including a processor, a memory, and a computer program that is stored in the memory and that can run on the processor, and when the computer program is executed by the processor, steps of the resource scheduling method provided in the second aspect are implemented.

According to a seventh aspect, the embodiments of this application provide a computer-readable storage medium, where a computer program is stored in the computer-readable storage medium. When the computer program is executed by a processor, steps in the resource scheduling method in the first aspect or the second aspect are implemented.

DETAILED DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In this specification, the term "and/or" is merely an association relationship that describes associated objects, and represents that there may be three relationships. For example, A and/or B may represent three cases: only A exists, both A and B exist, and only B exists. In addition, the character "/" in this specification generally indicates that associated objects are in an "or" relationship. In a formula, the character "/" indicates that associated objects are in a "divided" relationship. If not stated, "a plurality of" in this specification means two or more.

For ease of clearly describing the technical solutions in the embodiments of this application, in the embodiments of this application, the words "first" and "second" are used to distinguish between same or similar items with basically the same functions or effects. A person skilled in the art may understand that the words "first" and "second" do not limit a quantity and an execution sequence.

In the embodiments of this application, the term such as "exemplary" or "for example" is used to indicate an example, an instance, or a description. Any embodiment or design scheme described as "exemplary" or "an example" in the embodiments of this application should not be construed as being preferable or advantageous than other embodiments or design schemes. Specifically, the words such as "exemplary" or "for example" are used to present related concepts in a specific manner. In the description of the embodiments of this application, unless otherwise specified, the meaning of "a plurality of" means two or more.

Figure 1:
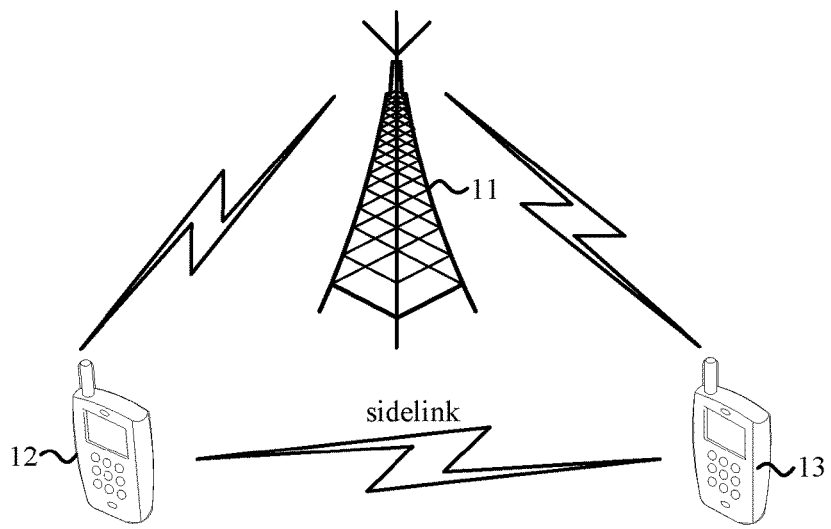
FIG. 1 is a possible schematic structural diagram of a communications system according to an embodiment of this application.

FIG. 1 is a possible schematic structural diagram of a communications system according to an embodiment of this application. As shown in FIG. 1, the communication system can include: a resource scheduling apparatus 11 (in FIG. 1, for example, the resource scheduling apparatus is a base station), a first terminal device 12, and a second terminal device 13 (in FIG. 1, for example, the first terminal device and the second terminal device are both mobile phones). Radio resource control (Radio Resource Control, RRC) is used to establish a wireless connection between the resource scheduling apparatus 11 and the first terminal device 12, and between the resource scheduling apparatus 11 and the second terminal device 13. A sidelink (sidelink, SL) is established between the first terminal device 12 and the second terminal device 13.

The resource scheduling apparatus 11 in the communication system in the embodiments of this application may be a base station, a core network device, a transmission and reception point (Transmission and Reception Point, TRP), a relay station, an access point, or the like. The resource scheduling apparatus 11 may also be a base transceiver station (Base Transceiver Station, BTS) in a global system for mobile communication (Global System for Mobile communication, GSM) or a code division multiple access (Code Division Multiple Access, CDMA) network, may be an NB (NodeB) in wideband code division multiple access (Wideband Code Division Multiple Access, WCDMA), or may be an eNB or an eNodeB (evolved NodeB) in LTE. The resource scheduling apparatus 11 may be alternatively a wireless controller in a cloud radio access network (Cloud Radio Access Network, CRAN) scenario. The resource scheduling apparatus 11 may be alternatively a base station (gNB) in the 5G communications system or a network side device in a future evolved network.

The terminal device 12 and the terminal device 13 may be wireless UE. The wireless UE may be a device that provides voice and/or other service data connectivity for a user, a handheld device with a wireless communication function, a computing device, another processing device connected to a wireless modem, an in-vehicle device, a wearable device, UE in a future 5G network, UE in a future evolved PLMN network, or the like. The wireless UE may communicate with one or more core networks by using a radio access network (Radio Access Network, RAN). The wireless UE may be a terminal device, such as a mobile phone (or referred to as a "cellular" phone) and a computer with a terminal device. For example, the wireless UE may be a portable, pocket-sized, handheld, computer built-in, or in-vehicle mobile apparatus that exchanges voice and/or data with a radio access network, and a device such as a personal communication service (Personal Communication Service, PCS) phone, a cordless phone, a session initiation protocol (Session Initiation Protocol, SIP) phone, a wireless local loop (Wireless Local Loop, WLL) station, or a personal digital assistant (Personal Digital Assistant, PDA). The wireless terminal may be alternatively a mobile device, a UE terminal, an access terminal, a wireless communications device, a terminal unit, a terminal station, a mobile station (Mobile Station), a mobile console (Mobile), a remote station (Remote Station), a distant station, a remote terminal (Remote Terminal), a subscriber unit (Subscriber Unit), a subscriber station (Subscriber Station), a user agent (User Agent), a terminal apparatus, or the like. In an example, in this embodiment of this application, a mobile phone is shown as an example of the terminal in FIG. 1.

The executor of the resource scheduling method provided in the embodiments of this application may be a terminal device and/or a resource scheduling apparatus on an SL, or may be a functional module and/or a functional entity that can implement the resource scheduling method in the terminal device and/or the resource scheduling apparatus on an SL. This may be specifically determined based on an actual usage requirement and is not limited in the embodiments of this application.

Figure 2:
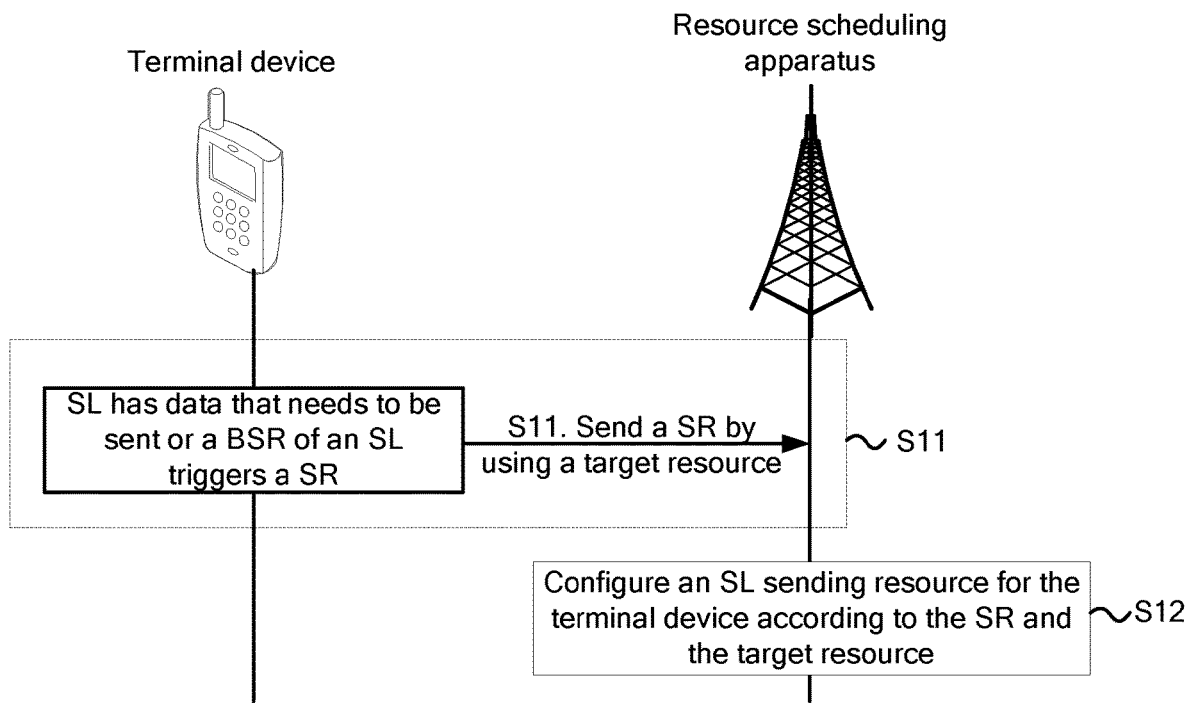
FIG. 2 is a flowchart of interaction of a resource scheduling method according to an embodiment of this application.

An embodiment of this application provides a resource scheduling method. Specifically, as shown in FIG. 2, the resource scheduling method may include the following steps:

S11. When data is needed to be sent on a SL, or a BSR of a SL triggers a SR, a terminal device sends a SR to a resource scheduling apparatus by using a target resource.

Correspondingly, the resource scheduling apparatus receives the SR sent by the terminal device by using the target resource.

The SR is used to request the resource scheduling apparatus to configure a SL sending resource for the terminal device.

Optionally, the target resource and/or the format of the target resource is configured by the network side device for the terminal device; or the target resource and/or a format of the target resource is predefined; or the target resource and/or a format of the target resource is specified in a communication protocol.

S12. The resource scheduling apparatus configures a SL sending resource for the terminal device according to the SR and the target resource.

In the resource scheduling method provided in the embodiments of this application, when data is needed to be sent on a SL, or a BSR of a SL triggers an SR, a SR is sent to a resource scheduling apparatus by using a target resource, where the SR is used to request the resource scheduling apparatus to configure a SL sending resource for the terminal device. That is, when data is needed to be sent on a SL, or a BSR of a SL triggers an SR, a SR is sent to a resource scheduling apparatus to request the resource scheduling apparatus to configure a SL sending resource for the terminal device. Therefore, the embodiments of this application can resolve the problem that how to schedule a SL resource is not provided in the related technologies.

Optionally, the target resource is a dedicated resource used by the terminal device to send a SR to the resource scheduling apparatus when data is needed to be sent on a SL, or a BSR of a SL triggers an SR; and/or a format of the target resource is a dedicated format of a resource used by the terminal device to send a SR to the resource scheduling apparatus when data is needed to be sent on a SL, or a BSR of a SL triggers an SR.

That is, in the foregoing embodiment, the target resource may be distinguished from resources other than the target resource in the following three manners:

First manner: The target resource is different from a resource used to send other data.

Second manner: The format of the target resource is different from that of a resource used to send other data.

Third manner: The target resource is different from a resource used to send other data, and the format of the target resource is different from that of the resource used to send the other data.

For example, the other data included in the above first, second, and third manners includes a SR for Uu service application carried on a data transmission link between a base station and a terminal device.

Optionally, the target resource is a dedicated resource used by the terminal device to send a SR to the resource scheduling apparatus when data is needed to be sent on a SL, or a BSR of a SL triggers an SR; and/or a format of the target resource is a dedicated format of a resource used by the terminal device to send a SR to the resource scheduling apparatus when data is needed to be sent on a SL, or a BSR of a SL triggers an SR. The method performed by the resource scheduling apparatus in the foregoing embodiments further includes:
  determining, according to the target resource and/or the format of the target resource, that the terminal device needs to send data on the SL, or the BSR of the SL triggers a scheduling request SR.

As can be seen from the manner of scheduling a resource for sending uplink data in the existing technology, when the terminal device needs to send uplink data, the terminal device needs to interact with a resource scheduling apparatus for many times, so that the resource for sending uplink data can be scheduled. However, when the terminal device interacts with the resource scheduling apparatus for many times, a communication latency of the communication system is long. In the foregoing embodiments, a dedicated resource is used to send a SR of a service carried on an SL, and/or a dedicated resource format is used to send a SR of a service carried on an SL. Therefore, after receiving the SR sent by using the dedicated resource and/or the dedicated resource format, the resource scheduling apparatus can determine that the SL has data that needs to be sent, or a BSR of the SL triggers a scheduling request SR, so as to directly schedule the resource for sending the data for the terminal device without receiving the BSR sent by the terminal device. Therefore, the foregoing embodiments can simplify the interaction process of scheduling to send the data, and reduce the communication latency of the communication system.

Further, before the step S11 (the sending a SR to a resource scheduling apparatus by using a target resource), the method provided in the embodiments of this application may further include:
  determining the target resource, according to at least one of a target data packet, a target data stream, a target service, a target logical channel, a target radio bearer, the terminal device, a target radio access type (Radio Access Type, RAT), a target source identifier, and a target destination identifier, wherein
  the target data packet is a data packet of the data that needs to be sent or a data packet of data indicated by the data buffer status reported by the BSR, the target data stream is a data stream of the data that needs to be sent or a data stream of data indicated by the data buffer status reported by the BSR, the target logical channel is a logical channel mapping the data that needs to be sent or a logical channel mapping data indicated by the data buffer status reported by the BSR, the target radio bearer is a radio bearer carrying the data that needs to be sent or data indicated by the data buffer status reported by the BSR, the target source identifier is used to identify a terminal device address or a service address or a media access control MAC address or a physical layer address of a transmit end of the data that needs to be sent or data indicated by the data buffer status reported by the BSR, and the target destination identifier is used to identify a terminal device address or a service address or a MAC layer address or a physical layer address of a receive end of the data that needs to be sent or data indicated by the data buffer status reported by the BSR.

When the terminal device further determines at least one of the target resource, a target source identifier, and a target destination identifier according to a target data packet, a target data stream, a target service, a target logical channel, a target radio bearer, the terminal device, and a target radio access type (Radio Access Type, RAT), and determines the target resource, the method provided in the embodiments of this application further includes:
  determining, by the resource scheduling apparatus, at least one of a target data packet, a target data stream, a target service, a target logical channel, a target radio bearer, the terminal device, a target radio access type RAT, a target source identifier, and a target destination identifier according to the target resource; and
  configuring, by the resource scheduling apparatus, the SL sending resource for the terminal device according to the SR and at least one of the target data packet, the target data stream, the target service, the target logical channel, the target radio bearer, the terminal device, the target radio access type RAT, the target source identifier, and the target destination identifier, where
  the target data packet is a data packet of the data that needs to be sent or a data packet of data indicated by the data buffer status reported by the BSR, the target data stream is a data stream of the data that needs to be sent or a data stream of data indicated by the data buffer status reported by the BSR, the target logical channel is a logical channel mapping the data that needs to be sent or a logical channel mapping data indicated by the data buffer status reported by the BSR, the target radio bearer is a radio bearer carrying the data that needs to be sent or data indicated by the data buffer status reported by the BSR, the target source identifier is used to identify a terminal device address or a service address or a media access control MAC address or a physical layer address of a transmit end of the data that needs to be sent or data indicated by the data buffer status reported by the BSR, and the target destination identifier is used to identify a terminal device address or a service address or a MAC layer address or a physical layer address of a receive end of the data that needs to be sent or data indicated by the data buffer status reported by the BSR.

Further, the following describes an example of the method in the foregoing embodiments.

For example, a logical channel mapping the data that needs to be sent or a logical channel indicated by the data cache status reported by the BSR is a logical channel A. The terminal device determines that the resource for sending the SR is a target resource 1 according to the target logical channel A. After receiving the SR sent by the terminal device by using the target resource 1, the resource scheduling apparatus may determine that the logical channel mapping the data that needs to be sent or the logical channel mapping the data indicated by the data cache status reported by the BSR is the logical channel A, and configure a SL sending resource for the terminal device according to the logical channel A and the SR.

For example, a radio bearer for carrying the data that needs to be sent or the data indicated by the data cache status reported by the BSR is a radio bearer A. The terminal device determines that the resource for sending the SR is a target resource 2 according to the radio bearer A. After receiving the SR sent by the terminal device by using the target resource 2, the resource scheduling apparatus may determine that the radio bearer for carrying the data that needs to be sent or the data indicated by the data cache status reported by the BSR is the radio bearer A.

For example, the target source identifier is used to identify a service address of the transmit end. The service address of the transmit end of the data that needs to be sent or the data indicated by the data cache status reported by the BSR is a service address A. The terminal device determines that the resource for sending the SR is a target resource 3 according to the service address A. After receiving the SR sent by the terminal device by using the target resource 3, the resource scheduling apparatus may determine that a service address of the transmit end carrying the data that needs to be sent or the data indicated by the data cache status reported by the BSR is the service address A, and configure a SL sending resource for the terminal device according to the service address A of the transmit end and the SR.

For example, the target source identifier is used to identify a service address of the receive end. The service address of the receive end of the data that needs to be sent or the data indicated by the data cache status reported by the BSR is a service address B. The terminal device determines that the resource for sending the SR is a target resource 4 according to the service address B. After receiving the SR sent by the terminal device by using the target resource 4, the resource scheduling apparatus may determine that a service address of the receive end carrying the data that needs to be sent or the data indicated by the data cache status reported by the BSR is the service address B, and configure a SL sending resource for the terminal device according to the service address B of the receive end and the SR.

For example, a data packet of the data that needs to be sent or a data packet of the data indicated by the data cache status reported by the BSR is a data packet A, and a data stream of the data that needs to be sent or a data stream of the data indicated by the data cache status reported by the BSR is a data stream A. The terminal device determines that the resource for sending the SR may be a target resource 5, a target resource 6, or a target resource 7 according to the data packet A, and determines that the resource for sending the SR may be a target resource 6, a target resource 8, or a target resource 9 according to the data stream A. Therefore, the terminal device determines that the resource for sending the SR is the target resource 6 according to the data packet A and the data stream A. After receiving the SR sent by the terminal device by using the target resource 6, the resource scheduling apparatus may determine that the data packet of the data that needs to be sent or the data packet of the data indicated by the data cache status reported by the BSR is the data packet A, and the data stream of the data that needs to be sent or the data stream of the data indicated by the data cache status reported by the BSR is the data stream A; and configure a SL sending resource for the terminal device according to the data packet A, the data stream A, and the SR.

Further optionally, the terminal device determines the target resource, according to at least one of a target data packet, a target data stream, a target service, a target logical channel, a target radio bearer, the terminal device, a target radio access type RAT, a target source identifier, and a target destination identifier, and may specifically perform at least one of the following 1 to 10:

1. Determine the target resource according to the priority information and a first mapping relationship.

The priority information includes at least one of a priority of the target data packet, a priority of the target data stream, a priority of the target service, a priority of the target logical channel, a priority of the terminal device, a priority of the target RAT, a priority of the target source identifier, and a priority of the target destination identifier, and the first mapping relationship includes a mapping relationship between the priority information and the target resource.

That is, different priorities correspond to different target resources.

2. Determine the target resource according to the sending manner and a second mapping relationship.

The sending manner includes at least one of a sending manner of the target data packet, a sending manner of the target data stream, a sending manner of the target service, a sending manner of the target logical channel, a sending manner of the terminal device, a sending manner of the target RAT, a sending manner of the target source identifier, and a sending manner of the target destination identifier, and the second mapping relationship includes a mapping relationship between the sending manner and the target resource.

Specifically, the sending manner in the foregoing embodiments is unicast, broadcast, or multicast.

That is, unicast, broadcast, or multicast corresponds to different target resources respectively.

3. Determine the target resource according to the data volume (payload) and a third mapping relationship.

The data volume includes at least one of a data volume of the target data packet, a data volume of the target data stream, a data volume of the target service, a data volume of the target logical channel, a data volume of the terminal device, a data volume of the target RAT, a data volume of the target source identifier, and a data volume of the target destination identifier, and the third mapping relationship includes a mapping relationship between the data volume and the target resource.

That is, different data volumes correspond to different target resources.

4. Determine the target resource according to the duration and a fourth mapping relationship.

The duration includes at least one of the duration of the target data packet, the duration of the target data stream, the duration of the target service, the duration of the target logical channel, the duration of the terminal device, the duration of the target RAT, the duration of the target source identifier, and the duration of the target destination identifier, and the fourth mapping relationship includes a mapping relationship between the duration and the target resource;

That is, different durations correspond to different target resources.

5. Determine the target resource according to a latency (latency) requirement and a fifth mapping relationship.

The latency requirement includes at least one of a latency requirement of the target data packet, a latency requirement of the target data stream, a latency requirement of the target service, a latency requirement of the target logical channel, a latency requirement of the terminal device, a latency requirement of the target RAT, a latency requirement of the target source identifier, and a latency requirement of the target destination identifier, and the fifth mapping relationship includes a mapping relationship between the latency requirement and the target resource;

That is, different latency requirements correspond to different target resources.

6. Determine the target resource according to a reliability (Reliability) requirement and a sixth mapping relationship.

The reliability requirement includes at least one of a reliability requirement of the target data packet, a reliability requirement of the target data stream, a reliability requirement of the target service, a reliability requirement of the target logical channel, a reliability requirement of the terminal device, a reliability requirement of the target RAT, a reliability requirement of the target source identifier, and a reliability requirement of the target destination identifier, and the sixth mapping relationship includes a mapping relationship between the reliability requirement and the target resource;

7. Determine the target resource according to the number of times of repeated sending and a seventh mapping relationship.

The number of times of repeated sending includes at least one of a number of times of repeated sending of the target data packet, a number of times of repeated sending of the target data stream, a number of times of repeated sending of the target service, a number of times of repeated sending of the target logical channel, a number of times of repeated sending of the terminal device, a number of times of repeated sending of the target RAT, a number of times of repeated sending of the target source identifier, and a number of times of repeated sending of the target destination identifier, and the seventh mapping relationship includes a mapping relationship between the number of times of repeated sending and the target resource.

That is, different numbers of times of repeated sending correspond to different target resources.

8. Determine the target resource according to the communication range (communication range) and the eighth mapping relationship.

The communication range includes at least one of a communication range of the target data packet, a communication range of the target data stream, a communication range of the target service, a communication range of the target logical channel, a communication range of the terminal device, a communication range of the target RAT, a communication range of the target source identifier, and a communication range of the target destination identifier, and the eighth mapping relationship includes a mapping relationship between the communication range and the target resource.

That is, different communication ranges correspond to different target resources.

9. Determine the target resource according to the sending rate and a ninth mapping relationship.

The sending rate includes at least one of a sending rate of the target data packet, a sending rate of the target data stream, a sending rate of the target service, a sending rate of the target logical channel, a sending rate of the terminal device, a sending rate of the target RAT, a sending rate of the target source identifier, and a sending rate of the target destination identifier, and the ninth mapping relationship includes a mapping relationship between the sending rate and the target resource; and That is, different sending rates correspond to different target resources.

10. Determine the target resource according to the data rate (Data rate) and a tenth mapping relationship.

The data rate includes at least one of a data rate of the target data packet, a data rate of the target data stream, a data rate of the target service, a data rate of the target logical channel, a data rate of the terminal device, a data rate of the target RAT, a data rate of the target source identifier, and a data rate of the target destination identifier, and the tenth mapping relationship includes a mapping relationship between the data rate and the target resource.

That is, different data rates correspond to different target resources.

Further, when the terminal device performs at least one of the foregoing 1 to 10, the resource scheduling apparatus determines at least one of a target data packet, a target data stream, a target service, a target logical channel, a target radio bearer, the terminal device, a target radio access type RAT, a target source identifier, and a target destination identifier according to the target resource, including performing at least one of the following A to J.

A. Determine the priority information according to the target resource and the first mapping relationship.

The first mapping relationship includes a mapping relationship between the priority information and the target resource, and the priority information includes at least one of a priority of the target data packet, a priority of the target data stream, a priority of the target service, a priority of the target logical channel, a priority of the terminal device, a priority of the target RAT, a priority of the target source identifier, and a priority of the target destination identifier.

B. Determine the sending manner according to the target resource and the second mapping relationship.

The second mapping relationship includes a mapping relationship between the sending manner and the target resource, and the sending manner includes at least one of a sending manner of the target data packet, a sending manner of the target data stream, a sending manner of the target service, a sending manner of the target logical channel, a sending manner of the terminal device, a sending manner of the target RAT, a sending manner of the target source identifier, and a sending manner of the target destination identifier.

C. Determine the data volume according to the target resource and the third mapping relationship.

The third mapping relationship includes a mapping relationship between the data volume and the target resource, and the data volume includes at least one of a data volume of the target data packet, a data volume of the target data stream, a data volume of the target service, a data volume of the target logical channel, a data volume of the terminal device, a data volume of the target RAT, a data volume of the target source identifier, and a data volume of the target destination identifier.

D. Determine the duration according to the target resource and the fourth mapping relationship.

The fourth mapping relationship includes a mapping relationship between the duration and the target resource, and the duration includes at least one of the duration of the target data packet, the duration of the target data stream, the duration of the target service, the duration of the target logical channel, the duration of the terminal device, the duration of the target RAT, the duration of the target source identifier, and the duration of the target destination identifier.

E. Determine the latency requirement according to the target resource and the fifth mapping relationship.

The fifth mapping relationship includes a mapping relationship between the latency requirement and the target resource, and the latency requirement includes at least one of a latency requirement of the target data packet, a latency requirement of the target data stream, a latency requirement of the target service, a latency requirement of the target logical channel, a latency requirement of the terminal device, a latency requirement of the target RAT, a latency requirement of the target source identifier, and a latency requirement of the target destination identifier.

F. Determine the reliability requirement according to the target resource and the sixth mapping relationship.

The sixth mapping relationship includes a mapping relationship between the reliability requirement and the target resource, and the reliability requirement includes at least one of a reliability requirement of the target data packet, a reliability requirement of the target data stream, a reliability requirement of the target service, a reliability requirement of the target logical channel, a reliability requirement of the terminal device, a reliability requirement of the target RAT, a reliability requirement of the target source identifier, and a reliability requirement of the target destination identifier.

G. Determine the number of times of repeated sending according to the target resource and the seventh mapping relationship.

The seventh mapping relationship includes a mapping relationship between the number of times of repeated sending and the target resource, and the number of times of repeated sending includes at least one of a number of times of repeated sending of the target data packet, a number of times of repeated sending of the target data stream, a number of times of repeated sending of the target service, a number of times of repeated sending of the target logical channel, a number of times of repeated sending of the terminal device, a number of times of repeated sending of the target RAT, a number of times of repeated sending of the target source identifier, and a number of times of repeated sending of the target destination identifier.

H. Determine the communication range according to the target resource and the eighth mapping relationship.

The eighth mapping relationship includes a mapping relationship between the communication range and the target resource, and the communication range includes at least one of a communication range of the target data packet, a communication range of the target data stream, a communication range of the target service, a communication range of the target logical channel, a communication range of the terminal device, a communication range of the target RAT, a communication range of the target source identifier, and a communication range of the target destination identifier.

I. Determine the sending rate according to the target resource and a ninth mapping relationship.

The ninth mapping relationship includes a mapping relationship between the sending rate and the target resource, and the sending rate includes at least one of a sending rate of the target data packet, a sending rate of the target data stream, a sending rate of the target service, a sending rate of the target logical channel, a sending rate of the terminal device, a sending rate of the target RAT, a sending rate of the target source identifier, and a sending rate of the target destination identifier.

J. Determine the data rate according to the target resource and the tenth mapping relationship.

The tenth mapping relationship includes a mapping relationship between the data rate and the target resource, and the data rate includes at least one of a data rate of the target data packet, a data rate of the target data stream, a data rate of the target service, a data rate of the target logical channel, a data rate of the terminal device, a data rate of the target RAT, a data rate of the target source identifier, and a data rate of the target destination identifier.

Further, the following describes an example of the method in the foregoing embodiments.

For example, a data packet of the data that needs to be sent or a data packet of the data indicated by the data cache status reported by the BSR is a data packet B (the target data packet is the data packet B), and the first mapping relationship includes a mapping relationship between a priority of the data packet B and the target resource. In this case, the terminal device determines that the resource for sending the SR is the target resource 1 according to the priority of the data packet B and the first mapping relationship. After receiving the SR sent by the terminal device by using the target resource 1, the resource scheduling apparatus may determine, according to the target resource and the first mapping relationship, a priority of the data packet of the data that needs to be sent or the data packet of the data indicated by the data cache status reported by the BSR, and configure a SL sending resource for the terminal device according to the priority of the data packet of the data that needs to be sent or the data packet of the data indicated by the data cache status reported by the BSR and the SR.

For example, a data stream of the data that needs to be sent or a data stream of the data indicated by the data cache status reported by the BSR is a data stream B (the target data stream is the data stream B). The terminal device determines that the resource for sending the SR is a target resource 2 according to the sending manner of the data stream B and the second mapping relationship. After receiving the SR sent by the terminal device by using the target resource 2, the resource scheduling apparatus may determine, according to the target resource and the second mapping relationship, a sending manner of the data stream of the data that needs to be sent or the data stream of the data indicated by the data cache status reported by the BSR, and configure a SL sending resource for the terminal device according to the sending manner of the data stream of the data that needs to be sent or the data stream of the data indicated by the data cache status reported by the BSR and the SR.

For example, a service of the data that needs to be sent or a service of the data indicated by the data cache status reported by the BSR is a service A (the target service is the service A). The terminal device determines that the resource for sending the SR is a target resource 3 according to the duration of the service A and the fourth mapping relationship. After receiving the SR sent by the terminal device by using the target resource 3, the resource scheduling apparatus may determine, according to the target resource and the fourth mapping relationship, duration of the service of the data that needs to be sent or the service of the data indicated by the data cache status reported by the BSR, and configure a SL sending resource for the terminal device according to the duration of the service of the data that needs to be sent or the service of the data indicated by the data cache status reported by the BSR and the SR.

For example, a data packet of the data that needs to be sent or a data packet of the data indicated by the data cache status reported by the BSR is a data packet C (the target data packet is the data packet C), a data stream of the data that needs to be sent or a data stream of the data indicated by the data cache status reported by the BSR is a data stream C (the target data stream is the data stream C), and the first mapping relationship includes a mapping relationship between a priority of the data packet C and the target resource and a mapping relationship between a priority of the data stream C and the target resource. In this case, the terminal device determines that the resource for sending the SR is the target resource 3 according to the priority of the data packet C, the priority of the data stream C, and the first mapping relationship. After receiving the SR sent by the terminal device by using the target resource 3, the resource scheduling apparatus may determine, according to the target resource and the first mapping relationship, a priority of the data packet of the data that needs to be sent or the data packet of the data indicated by the data cache status reported by the BSR, and a priority of the data stream of the data that needs to be sent or the data stream of the data indicated by the data cache status reported by the BSR, and configure a SL sending resource for the terminal device according to the priority of the data packet of the data that needs to be sent or the data packet of the data indicated by the data cache status reported by the BSR, the priority of the data stream of the data that needs to be sent or the data stream of the data indicated by the data cache status reported by the BSR, and the SR.

For example, a logical channel mapping the data that needs to be sent or a logical channel indicated by the data cache status reported by the BSR is a logical channel A (the target logical channel is a logical channel A), and the number of times of repeated sending of the logical channel A is N (N is a positive integer greater than 0). The terminal device determines that the resource for sending the SR may be a target resource 3, a target resource 4, or a target resource 5 according to the number N of times of repeated sending of the logical channel A and the seventh mapping relationship. A service of the data that needs to be sent or a service of the data indicated by the data cache status reported by the BSR is a service B (the target service is the service B). The terminal device determines that the resource for sending the SR may be a target resource 4, a target resource 6, or a target resource 7 according to the communication range of the service B and the eighth mapping relationship. Therefore, the terminal device determines that the resource for sending the SR is the target resource 4. After receiving the SR sent by the terminal device by using the target resource 4, the resource scheduling apparatus may determine, according to the target resource, the seventh mapping relationship, and the eighth mapping relationship, the number N of times of repeated sending of the logical channel mapping the data that needs to be sent or the logical channel mapping the data indicated by the data cache status reported by the BSR, and a communication range of the service of the data that needs to be sent or the service of the data indicated by the data cache status reported by the BSR, and configure a SL sending resource for the terminal device according to the number N of times of repeated sending of the logical channel mapping the data that needs to be sent or the logical channel mapping the data indicated by the data cache status reported by the BSR, the communication range of the service of the data that needs to be sent or the service of the data indicated by the data cache status reported by the BSR, and the SR.

In the resource scheduling method provided in the foregoing embodiments, after receiving the SR sent by using the dedicated resource and/or dedicated resource format, the resource scheduling apparatus can determine that the SL has data that needs to be sent, or a BSR of the SL triggers a scheduling request SR, and determine at least one of the priority information, the sending manner, the data volume, the duration, the latency requirement, the reliability requirement, the number of times of repeated sending, the communication range, the sending rate, and the data rate according to the dedicated resource and/or dedicated resource format, so as to accurately schedule a data sending resource for the terminal device according to the at least one of the priority information, the sending manner, the data volume, the duration, the latency requirement, the reliability requirement, the number of times of repeated sending, the communication range, the sending rate, and the data rate without receiving the BSR sent by the terminal device. Therefore, the foregoing embodiments can simplify the interaction process of scheduling to send the data, and reduce the communication latency of the communication system.

Figure 3:
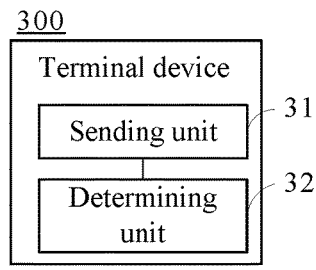
FIG. 3 is a schematic structural diagram of a terminal device according to an embodiment of this application.

Another embodiment of this application provides a terminal device. Specifically, as shown in FIG. 3, the terminal device 300 includes:

a sending unit 31, configured to: when data is needed to be sent on a SL, or a BSR of a SL triggers a scheduling request SR, send a SR to a resource scheduling apparatus by using a target resource, where the SR is used to request the resource scheduling apparatus to configure a SL sending resource for the terminal device.

When data is needed to be sent on a SL, or a BSR of a SL triggers an SR, the terminal device provided in the embodiments of this application sends a SR to a resource scheduling apparatus by using a target resource, where the SR is used to request the resource scheduling apparatus to configure a SL sending resource for the terminal device. That is, when data is needed to be sent on a SL, or a BSR of a SL triggers an SR, the terminal device sends a SR to a resource scheduling apparatus to request the resource scheduling apparatus to configure a SL sending resource for the terminal device. Therefore, the embodiments of this application can resolve the problem that how to schedule a SL resource is not provided in the related technologies.

Optionally, the target resource is a dedicated resource used by the terminal device to send a SR to the resource scheduling apparatus when data is needed to be sent on a SL, or a BSR of a SL triggers an SR; and/or a format of the target resource is a dedicated format of a resource used by the terminal device to send a SR to the resource scheduling apparatus when data is needed to be sent on a SL, or a BSR of a SL triggers an SR.

Optionally, the target resource and/or the format of the target resource is configured by the network side device for the terminal device; or the target resource and/or a format of the target resource is predefined; or the target resource and/or a format of the target resource is specified in a communication protocol.

Optionally, as shown in FIG. 3, the terminal device 300 further includes:

a determining unit 32, configured to determine the target resource, according to at least one of a target data packet, a target data stream, a target service, a target logical channel, a target radio bearer, the terminal device, a target radio access type RAT, a target source identifier, and a target destination identifier.

The target data packet is a data packet of the data that needs to be sent or a data packet of data indicated by the data buffer status reported by the BSR, the target data stream is a data stream of the data that needs to be sent or a data stream of data indicated by the data buffer status reported by the BSR, the target service is a service of the data that needs to be sent or a service of data indicated by the data buffer status reported by the BSR, the target logical channel is a logical channel mapping the data that needs to be sent or a logical channel mapping data indicated by the data buffer status reported by the BSR, the target radio bearer is a radio bearer carrying the data that needs to be sent or data indicated by the data buffer status reported by the BSR, the target source identifier is used to identify a terminal device address or a service address or a media access control MAC address or a physical layer address of a transmit end of the data that needs to be sent or data indicated by the data buffer status reported by the BSR, and the target destination identifier is used to identify a terminal device address or a service address or a MAC layer address or a physical layer address of a receive end of the data that needs to be sent or data indicated by the data buffer status reported by the BSR.

Optionally, the determining unit 32 is specifically configured to perform at least one of the following methods:

determining the target resource according to priority information and a first mapping relationship, where the priority information includes at least one of a priority of the target data packet, a priority of the target data stream, a priority of the target service, a priority of the target logical channel, a priority of the terminal device, a priority of the target RAT, a priority of the target source identifier, and a priority of the target destination identifier, and the first mapping relationship includes a mapping relationship between the priority information and the target resource;

determining the target resource according to a sending manner and a second mapping relationship, where the sending manner includes at least one of a sending manner of the target data packet, a sending manner of the target data stream, a sending manner of the target service, a sending manner of the target logical channel, a sending manner of the terminal device, a sending manner of the target RAT, a sending manner of the target source identifier, and a sending manner of the target destination identifier, and the second mapping relationship includes a mapping relationship between the sending manner and the target resource;

determining the target resource according to a data volume and a third mapping relationship, where the data volume includes at least one of a data volume of the target data packet, a data volume of the target data stream, a data volume of the target service, a data volume of the target logical channel, a data volume of the terminal device, a data volume of the target RAT, a data volume of the target source identifier, and a data volume of the target destination identifier, and the third mapping relationship includes a mapping relationship between the data volume and the target resource;

determining the target resource according to duration and a fourth mapping relationship, where the duration includes at least one of the duration of the target data packet, the duration of the target data stream, the duration of the target service, the duration of the target logical channel, the duration of the terminal device, the duration of the target RAT, the duration of the target source identifier, and the duration of the target destination identifier, and the fourth mapping relationship includes a mapping relationship between the duration and the target resource;

determining the target resource according to a latency requirement and a fifth mapping relationship, where the latency requirement includes at least one of a latency requirement of the target data packet, a latency requirement of the target data stream, a latency requirement of the target service, a latency requirement of the target logical channel, a latency requirement of the terminal device, a latency requirement of the target RAT, a latency requirement of the target source identifier, and a latency requirement of the target destination identifier, and the fifth mapping relationship includes a mapping relationship between the latency requirement and the target resource;

determining the target resource according to a reliability requirement and a sixth mapping relationship, where the reliability requirement includes at least one of a reliability requirement of the target data packet, a reliability requirement of the target data stream, a reliability requirement of the target service, a reliability requirement of the target logical channel, a reliability requirement of the terminal device, a reliability requirement of the target RAT, a reliability requirement of the target source identifier, and a reliability requirement of the target destination identifier, and the sixth mapping relationship includes a mapping relationship between the reliability requirement and the target resource;

determining the target resource according to a number of times of repeated sending and a seventh mapping relationship, where the number of times of repeated sending includes at least one of a number of times of repeated sending of the target data packet, a number of times of repeated sending of the target data stream, a number of times of repeated sending of the target service, a number of times of repeated sending of the target logical channel, a number of times of repeated sending of the terminal device, a number of times of repeated sending of the target RAT, a number of times of repeated sending of the target source identifier, and a number of times of repeated sending of the target destination identifier, and the seventh mapping relationship includes a mapping relationship between the number of times of repeated sending and the target resource;

determining the target resource according to a communication range and an eighth mapping relationship, where the communication range includes at least one of a communication range of the target data packet, a communication range of the target data stream, a communication range of the target service, a communication range of the target logical channel, a communication range of the terminal device, a communication range of the target RAT, a communication range of the target source identifier, and a communication range of the target destination identifier, and the eighth mapping relationship includes a mapping relationship between the communication range and the target resource;

determining the target resource according to a sending rate and a ninth mapping relationship, where the sending rate includes at least one of a sending rate of the target data packet, a sending rate of the target data stream, a sending rate of the target service, a sending rate of the target logical channel, a sending rate of the terminal device, a sending rate of the target RAT, a sending rate of the target source identifier, and a sending rate of the target destination identifier, and the ninth mapping relationship includes a mapping relationship between the sending rate and the target resource; and determining the target resource according to a data rate and a tenth mapping relationship, where the data rate includes at least one of a data rate of the target data packet, a data rate of the target data stream, a data rate of the target service, a data rate of the target logical channel, a data rate of the terminal device, a data rate of the target RAT, a data rate of the target source identifier, and a data rate of the target destination identifier, and the tenth mapping relationship includes a mapping relationship between the data rate and the target resource.

For the terminal device provided in the foregoing embodiments, after receiving the SR sent by using the dedicated resource and/or dedicated resource format, the resource scheduling apparatus can determine that the SL has data that needs to be sent, or a BSR of the SL triggers a scheduling request SR, and determine at least one of the priority information, the sending manner, the data volume, the duration, the latency requirement, the reliability requirement, the number of times of repeated sending, the communication range, the sending rate, and the data rate according to the dedicated resource and/or dedicated resource format, so as to accurately schedule a data sending resource for the terminal device according to the at least one of the priority information, the sending manner, the data volume, the duration, the latency requirement, the reliability requirement, the number of times of repeated sending, the communication range, the sending rate, and the data rate without receiving the BSR sent by the terminal device. Therefore, the foregoing embodiments can simplify the interaction process of scheduling to send the data, and reduce the communication latency of the communication system.

Figure 4:
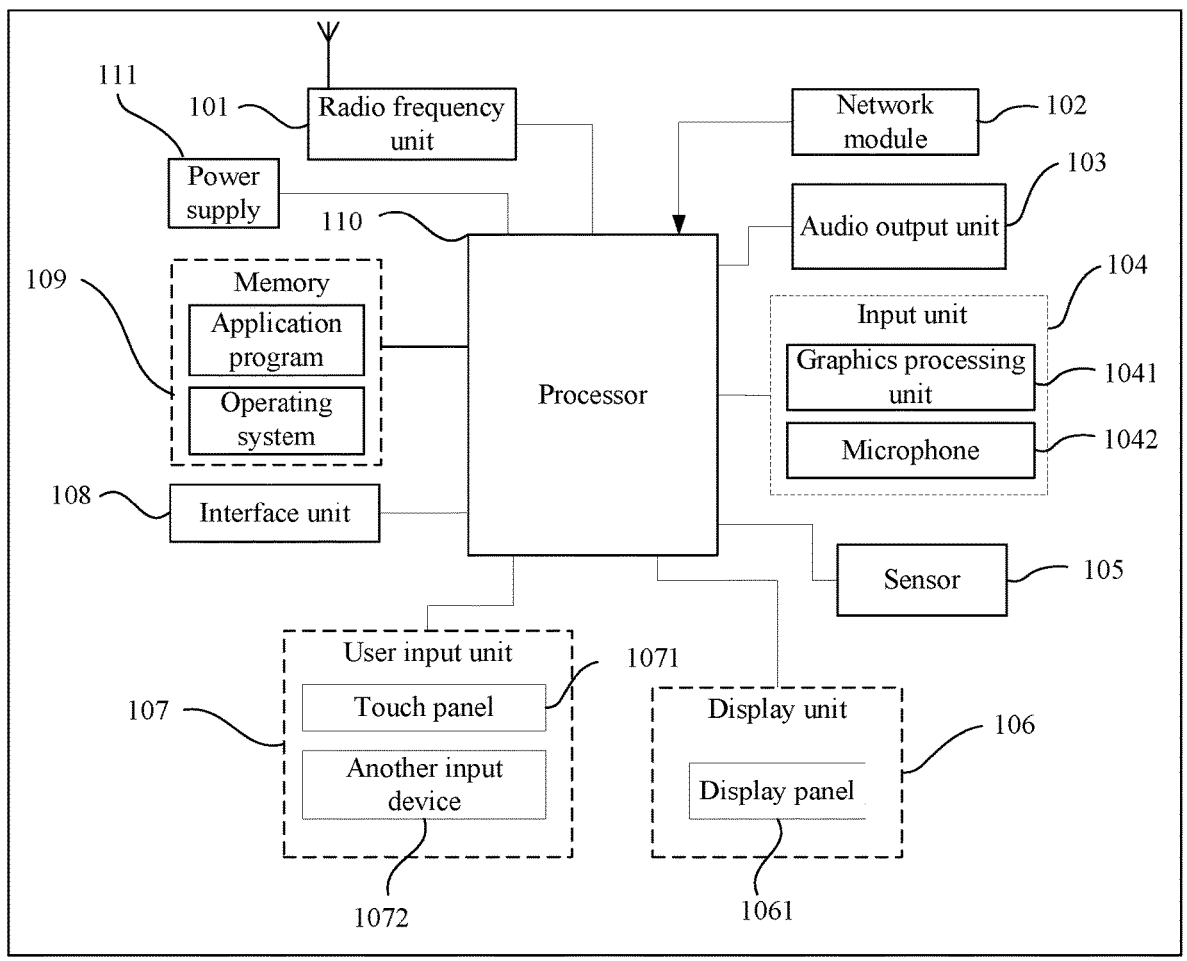
FIG. 4 is a schematic structural diagram of hardware of a terminal device according to an embodiment of this application.

FIG. 4 is a schematic structural diagram of hardware of a terminal device implementing the embodiments of this application. The terminal device includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that the structure of the terminal device shown in FIG. 4 does not constitute a limitation to the terminal device. The terminal device may include more or fewer components than that shown in the figure, or a combination of some components, or an arrangement of different components. In this embodiment of this application, the terminal device includes but is not limited to a mobile phone, a tablet computer, a notebook computer, a palmtop computer, a vehicle-mounted terminal, a wearable device, a pedometer, or the like.

The radio frequency unit 101 is configured to: when data is needed to be sent on a SL, or a BSR of a SL triggers a scheduling request SR, send a SR to a resource scheduling apparatus by using a target resource, where the SR is used to request the resource scheduling apparatus to configure a SL sending resource for the terminal device.

When data is needed to be sent on a SL, or a BSR of a SL triggers an SR, the terminal device provided in the embodiments of this application sends a SR to a resource scheduling apparatus by using a target resource, where the SR is used to request the resource scheduling apparatus to configure a SL sending resource for the terminal device. That is, when data is needed to be sent on a SL, or a BSR of a SL triggers an SR, the terminal device sends a SR to a resource scheduling apparatus to request the resource scheduling apparatus to configure a SL sending resource for the terminal device. Therefore, the embodiments of this application can resolve the problem that how to schedule a SL resource is not provided in the related technologies.

It should be understood that, in this embodiment of this application, the radio frequency unit 101 may be configured to receive and transmit information, or receive and transmit signals during a call. Specifically, the radio frequency unit receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device by using a wireless communication system and network.

The terminal device provides a user with wireless broadband Internet access through the network module 102, for example, helps the user send and receive emails, browse web pages, and access streaming media.

The audio output unit 103 can convert audio data received by the radio frequency unit 101 or the network module 102 or stored in the memory 109 into an audio signal, and output the audio signal as sound. In addition, the audio output unit 103 can also provide audio output related to a specific function performed by the terminal device (for example, call signal receiving sound or message receiving sound). The audio output unit 103 includes a speaker, a buzzer, a telephone receiver, and the like.

The input unit 104 is configured to receive audio or video signals. The input unit 104 may include a graphics processing unit (Graphics Processing Unit, GPU) 1041 and a microphone 1042. The graphics processing unit 1041 processes image data of a static picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such sound into audio data. The audio data obtained through processing may be converted, in a telephone call mode, into a format that can be sent to a mobile communications base station via the radio frequency unit 101 for output.

The terminal device further includes at least one sensor 105, such as a light sensor, a motion sensor, and other sensors. Specifically, the light sensor includes an ambient light sensor and a proximity sensor. The ambient light sensor can adjust a brightness of a display panel 1061 based on a brightness of ambient light. The proximity sensor can close the display panel 1061 and/or backlight when the terminal device moves to an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 106 is configured to display information entered by a user or information provided for a user. The display unit 106 may include a display panel 1061, and the display panel 1061 may be configured in a form of a liquid crystal display (Liquid Crystal Display, LCD), an organic light-emitting diode (Organic Light-Emitting Diode, OLED), or the like.

The user input unit 107 may be configured to receive input numeral or character information, and generate key signal input related to user setting and function control of the terminal device. Specifically, the user input unit 107 includes a touch panel 1071 and other input devices 1072. The touch panel 1071, also called a touch screen, may collect a touch operation of the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented by using a plurality of types such as a resistive type, a capacitive type, an infrared ray, and a surface acoustic wave. In addition to the touch panel 1071, the user input unit 107 may further include the another input device 1072. Specifically, the another input device 1072 may include, but is not limited to, a physical keyboard, function keys (such as a volume control key and a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 4, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface connecting an external apparatus to the terminal device. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 108 may be configured to receive input (for example, data information and power) from an external apparatus and transmit the received input to one or more elements within the terminal device, or may be configured to transmit data between the terminal device and the external apparatus.

The memory 109 may be configured to store software programs and various data. The memory 109 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 109 may include a high-speed random access memory or a nonvolatile memory, for example, at least one magnetic disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 can include one or more processing units. Preferably, the processor 110 can be integrated with an application processor and a modem processor. The application processor mainly processes the operating system, the user interface, applications, etc. The modem processor mainly processes wireless communication. It can be understood that the above-mentioned modem processor may not be integrated in the processor 110.

The terminal device may further include the power supply 111 (for example, a battery) configured to supply power to various components. Preferably, the power supply 111 may be logically connected to the processor 110 through a power management system, so as to implement functions such as managing charging, discharging, and power consumption through the power management system.

In addition, the terminal device includes some functional modules not shown. Details are not described herein again.

Figure 5:
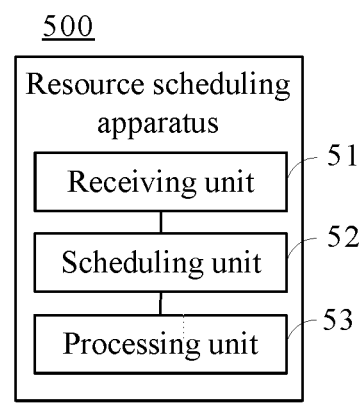
FIG. 5 is a schematic structural diagram of a resource scheduling apparatus according to an embodiment of this application.

Another embodiment of this application provides a resource scheduling apparatus. Specifically, as shown in FIG. 5, the resource scheduling apparatus 500 includes:

a receiving unit 51, configured to receive a scheduling request SR sent by a terminal device by using a target resource, where the SR is used to request the resource scheduling apparatus to configure, for the terminal device, a resource used to send either data that needs to be sent on a SL or data indicated by a data buffer status of a BSR of an SL; and a scheduling unit 52, configured to configure a SL sending resource for the terminal device according to the SR and the target resource.

The resource scheduling apparatus provided in the embodiments of this application first receives a scheduling request SR sent by a terminal device by using a target resource, and then configures a SL sending resource for the terminal device according to the SR and the target resource, where the SR is used to request the resource scheduling apparatus to configure, for the terminal device, a resource used to send data that needs to be sent on a SL or data indicated by a data buffer status of a BSR of an SL. That is, when data is needed to be sent on a SL, or a BSR of a SL triggers an SR, the terminal device sends a SR to a resource scheduling apparatus to request the resource scheduling apparatus to configure a SL sending resource for the terminal device. Therefore, the embodiments of this application can resolve the problem that how to schedule a SL resource is not provided in the related technologies.

Optionally, the target resource is a dedicated resource used by the terminal device to send a SR to the resource scheduling apparatus when data is needed to be sent on a SL, or a BSR of a SL triggers an SR; and/or a format of the target resource is a dedicated format of a resource used by the terminal device to send a SR to the resource scheduling apparatus when data is needed to be sent on a SL, or a BSR of a SL triggers an SR.

The receiving unit 51 is further configured to determine, according to the target resource and/or the format of the target resource, that the terminal device needs to send data on the SL, or the BSR of the SL triggers a scheduling request SR.

Optionally, the target resource and/or the format of the target resource is configured by the network side device for the terminal device; or the target resource and/or a format of the target resource is predefined; or the target resource and/or a format of the target resource is specified in a communication protocol.

Optionally, as shown in FIG. 5, the resource scheduling apparatus 500 further includes:
  a processing unit 53, configured to determine the target resource, according to at least one of a target data packet, a target data stream, a target service, a target logical channel, a target radio bearer, the terminal device, a target radio access type RAT, a target source identifier, and a target destination identifier; and
  the scheduling unit 52 is specifically configured to configure the SL sending resource for the terminal device according to the SR and at least one of the target data packet, the target data stream, the target service, the target logical channel, the target radio bearer, the terminal device, the target radio access type RAT, the target source identifier, and the target destination identifier, where
  the target data packet is a data packet of the data that needs to be sent or a data packet of data indicated by the data buffer status reported by the BSR, the target data stream is a data stream of the data that needs to be sent or a data stream of data indicated by the data buffer status reported by the BSR, the target service is a service of the data that needs to be sent or a service of data indicated by the data buffer status reported by the BSR, the target logical channel is a logical channel mapping the data that needs to be sent or a logical channel mapping data indicated by the data buffer status reported by the BSR, the target radio bearer is a radio bearer carrying the data that needs to be sent or data indicated by the data buffer status reported by the BSR, the target source identifier is used to identify a terminal device address or a service address or a media access control MAC address or a physical layer address of a transmit end of the data that needs to be sent or data indicated by the data buffer status reported by the BSR, and the target destination identifier is used to identify a terminal device address or a service address or a MAC layer address or a physical layer address of a receive end of the data that needs to be sent or data indicated by the data buffer status reported by the BSR.

Optionally, the processing unit 53 is specifically configured to perform at least one of the following methods:

determining priority information according to the target resource and a first mapping relationship, where the first mapping relationship includes a mapping relationship between the priority information and the target resource, and the priority information includes at least one of a priority of the target data packet, a priority of the target data stream, a priority of the target service, a priority of the target logical channel, a priority of the terminal device, a priority of the target RAT, a priority of the target source identifier, and a priority of the target destination identifier;

determining a sending manner according to the target resource and a second mapping relationship, where the second mapping relationship includes a mapping relationship between the sending manner and the target resource, and the sending manner includes at least one of a sending manner of the target data packet, a sending manner of the target data stream, a sending manner of the target service, a sending manner of the target logical channel, a sending manner of the terminal device, a sending manner of the target RAT, a sending manner of the target source identifier, and a sending manner of the target destination identifier;

determining a data volume according to the target resource and a third mapping relationship, where the third mapping relationship includes a mapping relationship between the data volume and the target resource, and the data volume includes at least one of a data volume of the target data packet, a data volume of the target data stream, a data volume of the target service, a data volume of the target logical channel, a data volume of the terminal device, a data volume of the target RAT, a data volume of the target source identifier, and a data volume of the target destination identifier;

determining duration according to the target resource and a fourth mapping relationship, where the fourth mapping relationship includes a mapping relationship between the duration and the target resource, and the duration includes at least one of the duration of the target data packet, the duration of the target data stream, the duration of the target service, the duration of the target logical channel, the duration of the terminal device, the duration of the target RAT, the duration of the target source identifier, and the duration of the target destination identifier;

determining a latency requirement according to the target resource and a fifth mapping relationship, where the fifth mapping relationship includes a mapping relationship between the latency requirement and the target resource, and the latency requirement includes at least one of a latency requirement of the target data packet, a latency requirement of the target data stream, a latency requirement of the target service, a latency requirement of the target logical channel, a latency requirement of the terminal device, a latency requirement of the target RAT, a latency requirement of the target source identifier, and a latency requirement of the target destination identifier;

determining a reliability requirement according to the target resource and a sixth mapping relationship, where the sixth mapping relationship includes a mapping relationship between the reliability requirement and the target resource, and the reliability requirement includes at least one of a reliability requirement of the target data packet, a reliability requirement of the target data stream, a reliability requirement of the target service, a reliability requirement of the target logical channel, a reliability requirement of the terminal device, a reliability requirement of the target RAT, a reliability requirement of the target source identifier, and a reliability requirement of the target destination identifier;

determining a number of times of repeated sending according to the target resource and a seventh mapping relationship, where the seventh mapping relationship includes a mapping relationship between the number of times of repeated sending and the target resource, and the number of times of repeated sending includes at least one of a number of times of repeated sending of the target data packet, a number of times of repeated sending of the target data stream, a number of times of repeated sending of the target service, a number of times of repeated sending of the target logical channel, a number of times of repeated sending of the terminal device, a number of times of repeated sending of the target RAT, a number of times of repeated sending of the target source identifier, and a number of times of repeated sending of the target destination identifier;

determining a communication range according to the target resource and an eighth mapping relationship, where the eighth mapping relationship includes a mapping relationship between the communication range and the target resource, and the communication range includes at least one of a communication range of the target data packet, a communication range of the target data stream, a communication range of the target service, a communication range of the target logical channel, a communication range of the terminal device, a communication range of the target RAT, a communication range of the target source identifier, and a communication range of the target destination identifier;

determining a sending rate according to the target resource and a ninth mapping relationship, where the ninth mapping relationship includes a mapping relationship between the sending rate and the target resource, and the sending rate includes at least one of a sending rate of the target data packet, a sending rate of the target data stream, a sending rate of the target service, a sending rate of the target logical channel, a sending rate of the terminal device, a sending rate of the target RAT, a sending rate of the target source identifier, and a sending rate of the target destination identifier; and determining a data rate according to the target resource and a tenth mapping relationship, where the tenth mapping relationship includes a mapping relationship between the data rate and the target resource, and the data rate includes at least one of a data rate of the target data packet, a data rate of the target data stream, a data rate of the target service, a data rate of the target logical channel, a data rate of the terminal device, a data rate of the target RAT, a data rate of the target source identifier, and a data rate of the target destination identifier.

After receiving the SR sent by using the dedicated resource and/or dedicated resource format, the resource scheduling apparatus in the foregoing embodiments can determine that the SL has data that needs to be sent, or a BSR of the SL triggers a scheduling request SR, and determine at least one of the priority information, the sending manner, the data volume, the duration, the latency requirement, the reliability requirement, the number of times of repeated sending, the communication range, the sending rate, and the data rate according to the dedicated resource and/or dedicated resource format, so as to accurately schedule a data sending resource for the terminal device according to the at least one of the priority information, the sending manner, the data volume, the duration, the latency requirement, the reliability requirement, the number of times of repeated sending, the communication range, the sending rate, and the data rate without receiving the BSR sent by the terminal device. Therefore, the foregoing embodiments can simplify the interaction process of scheduling to send the data, and reduce the communication latency of the communication system.

Figure 6:
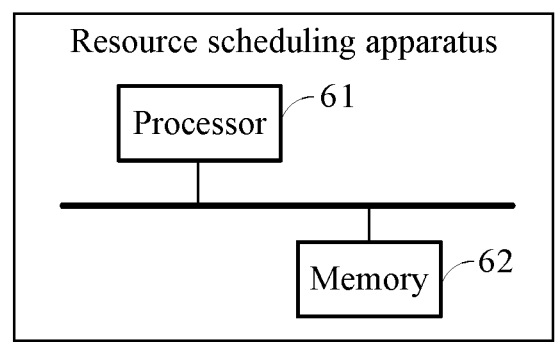
FIG. 6 is a schematic structural diagram of hardware of a resource scheduling apparatus according to an embodiment of this application.

Further, as shown in FIG. 6, an embodiment of this application further provides a resource scheduling apparatus, including a processor 61, a memory 62, and a computer program that is stored in the memory 62 and that can run on the processor 61. When the computer program is executed by the processor, steps of the resource scheduling method in the foregoing embodiments are implemented.

An embodiment of this application further provides a computer readable storage medium, storing a computer program, where the computer program, when executed by a processor, implements the plurality of processes of the resource scheduling method in the foregoing embodiments, and the same technical effects can be achieved. To avoid repetition, details are not described herein again. The computer readable storage medium is, for example, a read-only memory (Read-Only Memory, ROM for short), a random access memory (Random Access Memory, RAM for short), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements, but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a network side device, or the like) to perform the resource scheduling method described in the plurality of embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from the protection scope of aims of this application and claims, all of which fall within the protection of this application.

The invention claimed is:
1. A resource scheduling method, performed by a terminal device, the method comprising:
when data is needed to be sent on a sidelink (SL), or a buffer status report (BSR) of a SL triggers a scheduling request (SR), sending a SR to a resource scheduling apparatus by using a target resource, wherein
the SR is used to request the resource scheduling apparatus to configure a SL sending resource for the terminal device,
wherein the target resource is a dedicated resource used by the terminal device not to send a SR to the resource scheduling apparatus until (i) data is needed to be sent on a SL or (ii) a BSR of a SL triggers an SR; and/or
a format of the target resource is a dedicated format of a resource used by the terminal device not to send a SR to the resource scheduling apparatus until (iii) data is needed to be sent on a SL or (iv) a BSR of a SL triggers an SR,
wherein before the sending a SR to a resource scheduling apparatus by using a target resource, the method further comprises:
determining the target resource, according to at least one of a target data packet, a target data stream, a target service, a target logical channel, a target radio bearer, the terminal device, a target radio access type (RAT), a target source identifier, or a target destination identifier, wherein
the target data packet is a data packet of the data that needs to be sent or a data packet of data indicated by the data buffer status reported by the BSR, the target data stream is a data stream of the data that needs to be sent or a data stream of data indicated by the data buffer status reported by the BSR, the target service is a service of the data that needs to be sent or a service of data indicated by the data buffer status reported by the BSR, the target logical channel is a logical channel mapping the data that needs to be sent or a logical channel mapping data indicated by the data buffer status reported by the BSR, the target radio bearer is a radio bearer carrying the data that needs to be sent or data indicated by the data buffer status reported by the BSR, the target source identifier is used to identify a terminal device address or a service address or a media access control (MAC) address or a physical layer address of a transmit end of the data that needs to be sent or data indicated by the data buffer status reported by the BSR, and the target destination identifier is used to identify a terminal device address or a service address or a MAC layer address or a physical layer address of a receive end of the data that needs to be sent or data indicated by the data buffer status reported by the BSR,
wherein the determining at least one of the target resource, a target source identifier, and a target destination identifier according to a target data packet, a target data stream, a target service, a target logical channel, a target radio bearer, the terminal device, and a target radio access type (RAT), and determining the target resource comprises performing at least one of the following methods;
determining the target resource according to priority information and a first mapping relationship, wherein the priority information comprises at least one of a priority of the target data packet, a priority of the target data stream, a priority of the target service, a priority of the target logical channel, a priority of the terminal device, a priority of the target RAT, a priority of the target source identifier, and a priority of the target destination identifier, and the first mapping relationship comprises a mapping relationship between the priority information and the target resource;
determining the target resource according to a sending manner and a second mapping relationship, wherein the sending manner comprises at least one of a sending manner of the target data packet, a sending manner of the target data stream, a sending manner of the target service, a sending manner of the target logical channel, a sending manner of the terminal device, a sending manner of the target RAT, a sending manner of the target source identifier, and a sending manner of the target destination identifier, and the second mapping relationship comprises a mapping relationship between the sending manner and the target resource;
determining the target resource according to a data volume and a third mapping relationship, wherein the data volume comprises at least one of a data volume of the target data packet, a data volume of the target data stream, a data volume of the target service, a data volume of the target logical channel, a data volume of the terminal device, a data volume of the target RAT, a data volume of the target source identifier, and a data volume of the target destination identifier, and the third mapping relationship comprises a mapping relationship between the data volume and the target resource;
determining the target resource according to duration and a fourth mapping relationship, wherein the duration comprises at least one of the duration of the target data packet, the duration of the target data stream, the duration of the target service, the duration of the target logical channel, the duration of the terminal device, the duration of the target RAT, the duration of the target source identifier, and the duration of the target destination identifier, and the fourth mapping relationship comprises a mapping relationship between the duration and the target resource;
determining the target resource according to a latency requirement and a fifth mapping relationship, wherein the latency requirement comprises at least one of a latency requirement of the target data packet, a latency requirement of the target data stream, a latency requirement of the target service, a latency requirement of the target logical channel, a latency requirement of the terminal device, a latency requirement of the target RAT, a latency requirement of the target source identifier, and a latency requirement of the target destination identifier, and the fifth mapping relationship comprises a mapping relationship between the latency requirement and the target resource;
determining the target resource according to a reliability requirement and a sixth mapping relationship, wherein the reliability requirement comprises at least one of a reliability requirement of the target data packet, a reliability requirement of the target data stream, a reliability requirement of the target service, a reliability requirement of the target logical channel, a reliability requirement of the terminal device, a reliability requirement of the target RAT, a reliability requirement of the target source identifier, and a reliability requirement of the target destination identifier, and the sixth mapping relationship comprises a mapping relationship between the reliability requirement and the target resource;
determining the target resource according to a number of times of repeated sending and a seventh mapping relationship, wherein the number of times of repeated sending comprises at least one of a number of times of repeated sending of the target data packet, a number of times of repeated sending of the target data stream, a number of times of repeated sending of the target service, a number of times of repeated sending of the target logical channel, a number of times of repeated sending of the terminal device, a number of times of repeated sending of the target RAT, a number of times of repeated sending of the target source identifier, and a number of times of repeated sending of the target destination identifier, and the seventh mapping relationship comprises a mapping relationship between the number of times of repeated sending and the target resource;

determining the target resource according to a communication range and an eighth mapping relationship, wherein the communication range comprises at least one of a communication range of the target data packet, a communication range of the target data stream, a communication range of the target service, a communication range of the target logical channel, a communication range of the terminal device, a communication range of the target RAT, a communication range of the target source identifier, and a communication range of the target destination identifier, and the eighth mapping relationship comprises a mapping relationship between the communication range and the target resource;

determining the target resource according to a sending rate and a ninth mapping relationship, wherein the sending rate comprises at least one of a sending rate of the target data packet, a sending rate of the target data stream, a sending rate of the target service, a sending rate of the target logical channel, a sending rate of the terminal device, a sending rate of the target RAT, a sending rate of the target source identifier, and a sending rate of the target destination identifier, and the ninth mapping relationship comprises a mapping relationship between the sending rate and the target resource; or, determining the target resource according to a data rate and a tenth mapping relationship, wherein the data rate comprises at least one of a data rate of the target data packet, a data rate of the target data stream, a data rate of the target service, a data rate of the target logical channel, a data rate of the terminal device, a data rate of the target RAT, a data rate of the target source identifier, and a data rate of the target destination identifier, and the tenth mapping relationship comprises a mapping relationship between the data rate and the target resource.

2. The method according to claim 1, wherein
the target resource and/or the format of the target resource is configured by a network side device for the terminal device;
or, the target resource and/or a format of the target resource is predefined;
or, the target resource and/or a format of the target resource is specified in a communication protocol.

3. A non-transitory computer readable storage medium, wherein the non-transitory computer readable storage medium stores a computer program, and when the computer program is executed by a processor of a terminal device, the steps of the resource scheduling method according to claim 1 are performed.

4. The non-transitory computer readable storage medium according to claim 3, wherein
the target resource and/or the format of the target resource is configured by a network side device for the terminal device;
or, the target resource and/or a format of the target resource is predefined;
or, the target resource and/or a format of the target resource is specified in a communication protocol.

5. A resource scheduling method, performed by a resource scheduling apparatus, the method comprising:
receiving a scheduling request (SR) sent by a terminal device by using a target resource, wherein the SR is used to request the resource scheduling apparatus to configure, for the terminal device, a resource used to send either data that needs to be sent on a sidelink (SL) or data indicated by a data buffer status of a buffer status report (BSR) of an SL; and
configuring a SL sending resource for the terminal device according to the SR and the target resource,
wherein the target resource is a dedicated resource used by the terminal device not to send a SR to the resource scheduling apparatus until (i) data is needed to be sent on a SL or (ii) a BSR of a SL triggers an SR; and/or
a format of the target resource is a dedicated format of a resource used by the terminal device not to send a SR to the resource scheduling apparatus until (iii) data is needed to be sent on a SL or (iv) a BSR of a SL triggers an SR,
wherein the configuring a SL sending resource for the terminal device according to the SR and the target resource comprises:
determining the target resource, according to at least one of a target data packet, a target data stream, a target service, a target logical channel, a target radio bearer, the terminal device, a target radio access type (RAT), a target source identifier, or a target destination identifier; and
configuring the SL sending resource for the terminal device according to the SR and at least one of the target data packet, the target data stream, the target service, the target logical channel, the target radio bearer, the terminal device, the target radio access type (RAT), the target source identifier, or the target destination identifier, wherein
the target data packet is a data packet of the data that needs to be sent or a data packet of data indicated by the data buffer status reported by the BSR, the target data stream is a data stream of the data that needs to be sent or a data stream of data indicated by the data buffer status reported by the BSR, the target service is a service of the data that needs to be sent or a service of data indicated by the data buffer status reported by the BSR, the target logical channel is a logical channel mapping the data that needs to be sent or a logical channel mapping data indicated by the data buffer status reported by the BSR, the target radio bearer is a radio bearer carrying the data that needs to be sent or data indicated by the data buffer status reported by the BSR, the target source identifier is used to identify a terminal device address or a service address or a media access control (MAC) address or a physical layer address of a transmit end of the data that needs to be sent or data indicated by the data buffer status reported by the BSR, and the target destination identifier is used to identify a terminal device address or a service address or a MAC layer address or a physical layer address of a receive end of the data that needs to be sent or data indicated by the data buffer status reported by the BSR, wherein the determining at least one of a target data packet, a target data stream, a target service, a target logical channel, a target radio bearer, the terminal device, a target radio access type RAT, a target source identifier, or a target destination identifier according to the target resource comprises performing at least one of the following methods:

determining priority information according to the target resource and a first mapping relationship, wherein the first mapping relationship comprises a mapping relationship between the priority information and the target resource, and the priority information comprises at least one of a priority of the target data packet, a priority of the target data stream, a priority of the target service, a priority of the target logical channel, a priority of the terminal device, a priority of the target RAT, a priority of the target source identifier, and a priority of the target destination identifier;

determining a sending manner according to the target resource and a second mapping relationship, wherein the second mapping relationship comprises a mapping relationship between the sending manner and the target resource, and the sending manner comprises at least one of a sending manner of the target data packet, a sending manner of the target data stream, a sending manner of the target service, a sending manner of the target logical channel, a sending manner of the terminal device, a sending manner of the target RAT, a sending manner of the target source identifier, and a sending manner of the target destination identifier;

determining a data volume according to the target resource and a third mapping relationship, wherein the third mapping relationship comprises a mapping relationship between the data volume and the target resource, and the data volume comprises at least one of a data volume of the target data packet, a data volume of the target data stream, a data volume of the target service, a data volume of the target logical channel, a data volume of the terminal device, a data volume of the target RAT, a data volume of the target source identifier, and a data volume of the target destination identifier;

determining duration according to the target resource and a fourth mapping relationship, wherein the fourth mapping relationship comprises a mapping relationship between the duration and the target resource, and the duration comprises at least one of the duration of the target data packet, the duration of the target data stream, the duration of the target service, the duration of the target logical channel, the duration of the terminal device, the duration of the target RAT, the duration of the target source identifier, and the duration of the target destination identifier;

determining a latency requirement according to the target resource and a fifth mapping relationship, wherein the fifth mapping relationship comprises a mapping relationship between the latency requirement and the target resource, and the latency requirement comprises at least one of a latency requirement of the target data packet, a latency requirement of the target data stream, a latency requirement of the target service, a latency requirement of the target logical channel, a latency requirement of the terminal device, a latency requirement of the target RAT, a latency requirement of the target source identifier, and a latency requirement of the target destination identifier;

determining a reliability requirement according to the target resource and a sixth mapping relationship, wherein the sixth mapping relationship comprises a mapping relationship between the reliability requirement and the target resource, and the reliability requirement comprises at least one of a reliability requirement of the target data packet, a reliability requirement of the target data stream, a reliability requirement of the target service, a reliability requirement of the target logical channel, a reliability requirement of the terminal device, a reliability requirement of the target RAT, a reliability requirement of the target source identifier, and a reliability requirement of the target destination identifier;

determining a number of times of repeated sending according to the target resource and a seventh mapping relationship, wherein the seventh mapping relationship comprises a mapping relationship between the number of times of repeated sending and the target resource, and the number of times of repeated sending comprises at least one of a number of times of repeated sending of the target data packet, a number of times of repeated sending of the target data stream, a number of times of repeated sending of the target service, a number of times of repeated sending of the target logical channel, a number of times of repeated sending of the terminal device, a number of times of repeated sending of the target RAT, a number of times of repeated sending of the target source identifier, and a number of times of repeated sending of the target destination identifier;

determining a communication range according to the target resource and an eighth mapping relationship, wherein the eighth mapping relationship comprises a mapping relationship between the communication range and the target resource, and the communication range comprises at least one of a communication range of the target data packet, a communication range of the target data stream, a communication range of the target service, a communication range of the target logical channel, a communication range of the terminal device, a communication range of the target RAT, a communication range of the target source identifier, and a communication range of the target destination identifier;

determining a sending rate according to the target resource and a ninth mapping relationship, wherein the ninth mapping relationship comprises a mapping relationship between the sending rate and the target resource, and the sending rate comprises at least one of a sending rate of the target data packet, a sending rate of the target data stream, a sending rate of the target service, a sending rate of the target logical channel, a sending rate of the terminal device, a sending rate of the target RAT, a sending rate of the target source identifier, and a sending rate of the target destination identifier; or, determining a data rate according to the target resource and a tenth mapping relationship, wherein the tenth mapping relationship comprises a mapping relationship between the data rate and the target resource, and the data rate comprises at least one of a data rate of the target data packet, a data rate of the target data stream, a data rate of the target service, a data rate of the target logical channel, a data rate of the terminal device, a data rate of the target RAT, a data rate of the target source identifier, and a data rate of the target destination identifier.

6. The method according to claim 5, wherein the method further comprises:
determining, according to the target resource and/or the format of the target resource, that the terminal device needs to send data on the SL, or the BSR of the SL triggers a scheduling request SR.

7. The method according to claim 5, wherein
the target resource and/or the format of the target resource is configured by the network side device for the terminal device;
or, the target resource and/or a format of the target resource is predefined;
or, the target resource and/or a format of the target resource is specified in a communication protocol.

8. A resource scheduling apparatus, comprising a processor, a memory, and a computer program that is stored in the memory and that can run on the processor, wherein the computer program, when executed by the processor, the resource scheduling method applied to the resource scheduling apparatus according to claim 5 is realized.

9. The resource scheduling apparatus according to claim 8, wherein the method further comprises:
determining, according to the target resource and/or the format of the target resource, that the terminal device needs to send data on the SL, or the BSR of the SL triggers a scheduling request SR.

10. The resource scheduling apparatus according to claim 8, wherein
the target resource and/or the format of the target resource is configured by the network side device for the terminal device;
or, the target resource and/or a format of the target resource is predefined;
or, the target resource and/or a format of the target resource is specified in a communication protocol.

11. A non-transitory computer readable storage medium, wherein the non-transitory computer readable storage medium stores a computer program, and when the computer program is executed by a processor of a resource scheduling apparatus, the steps of the resource scheduling method according to claim 5 are performed.

12. The non-transitory computer readable storage medium according to claim 11, wherein the processor of the resource scheduling apparatus is further enabled to execute:
determining, according to the target resource and/or the format of the target resource, that the terminal device needs to send data on the SL, or the BSR of the SL triggers a scheduling request SR.

13. The non-transitory computer readable storage medium according to claim 11, wherein
the target resource and/or the format of the target resource is configured by the network side device for the terminal device;
or, the target resource and/or a format of the target resource is predefined;
or, the target resource and/or a format of the target resource is specified in a communication protocol.

14. A terminal device, comprising: a processor, a memory, and a computer program that is stored in the memory and that can run on the processor, wherein when the computer program is executed by the processor, a resource scheduling method applied to the terminal device is realized, wherein the method comprises:
when data is needed to be sent on a sidelink (SL), or a buffer status report (BSR) of a SL triggers a scheduling request (SR), sending a SR to a resource scheduling apparatus by using a target resource, wherein
the SR is used to request the resource scheduling apparatus to configure a SL sending resource for the terminal device,
wherein the target resource is a dedicated resource used by the terminal device not to send a SR to the resource scheduling apparatus until (i) data is needed to be sent on a SL or (ii) a BSR of a SL triggers an SR; and/or
a format of the target resource is a dedicated format of a resource used by the terminal device not to send a SR to the resource scheduling apparatus until (iii) data is needed to be sent on a SL or (iv) a BSR of a SL triggers an SR,
wherein before the sending a SR to a resource scheduling apparatus by using a target resource, the method further comprises:
determining the target resource, according to at least one of a target data packet, a target data stream, a target service, a target logical channel, a target radio bearer, the terminal device, a target radio access type (RAT), a target source identifier, or a target destination identifier, wherein
the target data packet is a data packet of the data that needs to be sent or a data packet of data indicated by the data buffer status reported by the BSR, the target data stream is a data stream of the data that needs to be sent or a data stream of data indicated by the data buffer status reported by the BSR, the target service is a service of the data that needs to be sent or a service of data indicated by the data buffer status reported by the BSR, the target logical channel is a logical channel mapping the data that needs to be sent or a logical channel mapping data indicated by the data buffer status reported by the BSR, the target radio bearer is a radio bearer carrying the data that needs to be sent or data indicated by the data buffer status reported by the BSR, the target source identifier is used to identify a terminal device address or a service address or a media access control (MAC) address or a physical layer address of a transmit end of the data that needs to be sent or data indicated by the data buffer status reported by the BSR, and the target destination identifier is used to identify a terminal device address or a service address or a MAC layer address or a physical layer address of a receive end of the data that needs to be sent or data indicated by the data buffer status reported by the BSR,
wherein the determining at least one of the target resource, a target source identifier, and a target destination identifier according to a target data packet, a target data stream, a target service, a target logical channel, a target radio bearer, the terminal device, and a target radio access type RAT, and determining the target resource comprises performing at least one of the following methods:
determining the target resource according to priority information and a first mapping relationship, wherein the priority information comprises at least one of a priority of the target data packet, a priority of the target data stream, a priority of the target service, a priority of the target logical channel, a priority of the terminal device, a priority of the target RAT, a priority of the target source identifier, and a priority of the target destination identifier, and the first mapping relationship comprises a mapping relationship between the priority information and the target resource;

determining the target resource according to a sending manner and a second mapping relationship, wherein the sending manner comprises at least one of a sending manner of the target data packet, a sending manner of the target data stream, a sending manner of the target service, a sending manner of the target logical channel, a sending manner of the terminal device, a sending manner of the target RAT, a sending manner of the target source identifier, and a sending manner of the target destination identifier, and the second mapping relationship comprises a mapping relationship between the sending manner and the target resource;

determining the target resource according to a data volume and a third mapping relationship, wherein the data volume comprises at least one of a data volume of the target data packet, a data volume of the target data stream, a data volume of the target service, a data volume of the target logical channel, a data volume of the terminal device, a data volume of the target RAT, a data volume of the target source identifier, and a data volume of the target destination identifier, and the third mapping relationship comprises a mapping relationship between the data volume and the target resource;

determining the target resource according to duration and a fourth mapping relationship, wherein the duration comprises at least one of the duration of the target data packet, the duration of the target data stream, the duration of the target service, the duration of the target logical channel, the duration of the terminal device, the duration of the target RAT, the duration of the target source identifier, and the duration of the target destination identifier, and the fourth mapping relationship comprises a mapping relationship between the duration and the target resource;

determining the target resource according to a latency requirement and a fifth mapping relationship, wherein the latency requirement comprises at least one of a latency requirement of the target data packet, a latency requirement of the target data stream, a latency requirement of the target service, a latency requirement of the target logical channel, a latency requirement of the terminal device, a latency requirement of the target RAT, a latency requirement of the target source identifier, and a latency requirement of the target destination identifier, and the fifth mapping relationship comprises a mapping relationship between the latency requirement and the target resource;

determining the target resource according to a reliability requirement and a sixth mapping relationship, wherein the reliability requirement comprises at least one of a reliability requirement of the target data packet, a reliability requirement of the target data stream, a reliability requirement of the target service, a reliability requirement of the target logical channel, a reliability requirement of the terminal device, a reliability requirement of the target RAT, a reliability requirement of the target source identifier, and a reliability requirement of the target destination identifier, and the sixth mapping relationship comprises a mapping relationship between the reliability requirement and the target resource;

determining the target resource according to a number of times of repeated sending and a seventh mapping relationship, wherein the number of times of repeated sending comprises at least one of a number of times of repeated sending of the target data packet, a number of times of repeated sending of the target data stream, a number of times of repeated sending of the target service, a number of times of repeated sending of the target logical channel, a number of times of repeated sending of the terminal device, a number of times of repeated sending of the target RAT, a number of times of repeated sending of the target source identifier, and a number of times of repeated sending of the target destination identifier, and the seventh mapping relationship comprises a mapping relationship between the number of times of repeated sending and the target resource;

determining the target resource according to a communication range and an eighth mapping relationship, wherein the communication range comprises at least one of a communication range of the target data packet, a communication range of the target data stream, a communication range of the target service, a communication range of the target logical channel, a communication range of the terminal device, a communication range of the target RAT, a communication range of the target source identifier, and a communication range of the target destination identifier, and the eighth mapping relationship comprises a mapping relationship between the communication range and the target resource;

determining the target resource according to a sending rate and a ninth mapping relationship, wherein the sending rate comprises at least one of a sending rate of the target data packet, a sending rate of the target data stream, a sending rate of the target service, a sending rate of the target logical channel, a sending rate of the terminal device, a sending rate of the target RAT, a sending rate of the target source identifier, and a sending rate of the target destination identifier, and the ninth mapping relationship comprises a mapping relationship between the sending rate and the target resource; or, determining the target resource according to a data rate and a tenth mapping relationship, wherein the data rate comprises at least one of a data rate of the target data packet, a data rate of the target data stream, a data rate of the target service, a data rate of the target logical channel, a data rate of the terminal device, a data rate of the target RAT, a data rate of the target source identifier, and a data rate of the target destination identifier, and the tenth mapping relationship comprises a mapping relationship between the data rate and the target resource.

15. The terminal device according to claim 14, wherein the target resource and/or the format of the target resource is configured by a network side device for the terminal device;

or, the target resource and/or a format of the target resource is predefined;

or, the target resource and/or a format of the target resource is specified in a communication protocol.

* * * * *